United States Patent
Blankenship et al.

(10) Patent No.: US 10,694,541 B2
(45) Date of Patent: *Jun. 23, 2020

(54) RANDOM ACCESS CONFIGURATION FOR MTC OPERATION

(71) Applicant: Telefonaktiebolaget LM Ericsson (publ), Stockholm (SE)

(72) Inventors: Yufei Blankenship, Kildeer, IL (US); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,004

(22) Filed: Dec. 12, 2018

(65) Prior Publication Data

US 2019/0191454 A1    Jun. 20, 2019

Related U.S. Application Data

(63) Continuation of application No. 15/127,641, filed as application No. PCT/SE2016/050750 on Aug. 12, 2016, now Pat. No. 10,194,464.

(Continued)

(51) Int. Cl.
  *H04W 74/00* (2009.01)
  *H04W 74/08* (2009.01)
  (Continued)

(52) U.S. Cl.
  CPC ....... *H04W 74/006* (2013.01); *H04W 74/004* (2013.01); *H04W 74/0833* (2013.01);
  (Continued)

(58) Field of Classification Search
  CPC ... H04W 74/00; H04W 74/08; H04W 74/006; H04W 74/0833; H04W 74/0841; H04W 74/004
  See application file for complete search history.

(56) References Cited

U.S. PATENT DOCUMENTS

2012/0236803 A1  9/2012  Vujcic et al.
2013/0301541 A1  11/2013 Mukherjee et al.
(Continued)

FOREIGN PATENT DOCUMENTS

EP        3026830 A1     6/2016
WO     2014112905 A1     7/2014
(Continued)

OTHER PUBLICATIONS

Unknown, Author, "Discussion on the power ramping for PRACH coverage enhancement", 3GPP TSG RAN WGl Meeting #80, RI-150397, Athens, Greece, Feb. 9-13, 2015, pp. 1-4.

(Continued)

*Primary Examiner* — Chi Ho A Lee
(74) *Attorney, Agent, or Firm* — Murphy, Bilak & Homiller, PLLC

(57) ABSTRACT

The present disclosure relates to methods for random access message repetition, as well as to a wireless device, and a network node executing these methods. When performed by a wireless device in a wireless network, the method comprises selecting a Random Access Channel (RACH) resource associated with a RACH configuration for random access message repetition with a pre-determined number of repetitions for a single random access attempt; and transmitting, for the single random access attempt, a random access message with the pre-determined number of repetitions using the selected RACH resource.

19 Claims, 7 Drawing Sheets

Related U.S. Application Data

(60) Provisional application No. 62/205,352, filed on Aug. 14, 2015.

(51) Int. Cl.
  *H04B 1/713* (2011.01)
  *H04L 5/00* (2006.01)

(52) U.S. Cl.
  CPC ............ *H04B 1/713* (2013.01); *H04L 5/0007* (2013.01); *H04W 74/0841* (2013.01)

(56) References Cited

U.S. PATENT DOCUMENTS

| | | |
|---|---|---|
| 2014/0241297 A1 | 8/2014 | Park et al. |
| 2015/0078188 A1 | 3/2015 | Xu et al. |
| 2015/0341911 A1 | 11/2015 | Wakabayashi et al. |
| 2015/0365977 A1 | 12/2015 | Tabet et al. |
| 2016/0242212 A1 | 8/2016 | Wong et al. |
| 2016/0269163 A1 | 9/2016 | Wong et al. |
| 2016/0338113 A1 | 11/2016 | Wu et al. |
| 2016/0353440 A1 | 12/2016 | Lee et al. |
| 2017/0141833 A1 | 5/2017 | Kim et al. |

FOREIGN PATENT DOCUMENTS

| | | |
|---|---|---|
| WO | 2015012666 A1 | 1/2015 |
| WO | 2015083997 A1 | 6/2015 |
| WO | 2015116732 A1 | 8/2015 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 1-53.

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.5.0, Mar. 2015, 1-77.

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.0.0, Sep. 2012, 1-106.

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.4.0, Dec. 2014, 1-124.

3GPP, "3rd Generation Partnership Project; Technical Specification Group Radio Access Network; Evolved Universal Terrestrial Radio Access (E-UTRA); Physical layer procedures (Release 10)", 3GPP TS 36.213 V10.6.0, Jun. 2012, 1-125.

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.4.0, Dec. 2014, 1-225.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.3.0, Sep. 2011, 1-296.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1, Dec. 2014, 1-410.

3GPP, "3rd Generation Partnership Project; Technical Specification Group Radio Access Network; Study on provision of low-cost Machine-Type Communications (MTC) User Equipments (UEs) based on LTE (Release 12)", 3GPP TR 36.888 V12.0.0, Jun. 2013, 1-55.

Ericsson, "Random Access for Rel-13 Low Complexity and Coverage Enhanced UEs", 3GPP TSG-RAN WG2 #90, Tdoc R2-152649, Fukuoka, Japan, May 25-29, 2015, 1-7.

Unknown, Author, "Consideration on RACH procedure in coverage enhancement", Huawei, HiSilicon, 3GPP TSG RAN WG2 Meeting #90, R2-152232, Fukuoka, Japan, May 25-29, 2015, 1-4.

Unknown, Author, "Determining starting PRACH resource set", Huawei, HiSilicon, 3GPP TSG RAN WG1 Meeting #81, R1-153213, Fukuoka, Japan, May 25-29, 2015, 1-4.

Unknown, Author, "New WI Proposal: Further LTE Physical Layer Enhancements for MTC", 3GPP TSG RAN Meeting #65, RP-141660, Edinburgh, Scotland, Sep. 9-12, 2014, 1-9.

Unknown, Author, "On coverage enhancement determination during random access procedure", Huawei, HiSilicon, 3GPP TSG RAN WG1 Meeting #81, R1-152454, Fukuoka, Japan, May 25-29, 2015, 1-4.

Unknown, Author, "PRACH Enhancement and Mechanism for Identifying Coverage Shortfall", NSN, Nokia, 3GPP TSG RAN1#74bis, R1-134517, Guangzhou, China, Oct. 7-11, 2013, 1-4.

Unknown, Author, "PRACH for LC-MTC", Alcatel-Lucent, Alcatel-Lucent Shanghai Bell, 3GPP TSG RAN WG1 Meeting #80bis, R1-151234, Belgrade, Serbia, Apr. 20-24, 2015, 1-4.

preamble opportunity at a given preamble opportunities used to transmit a preamble sequence, including preamble opportunity at a given narrowband preamble opportunities UE1 uses to transmit a preamble sequence, including repetitions preamble opportunities UE2 uses to transmit a preamble sequence, including repetitions

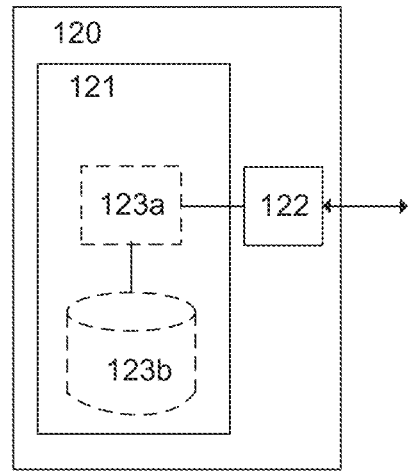 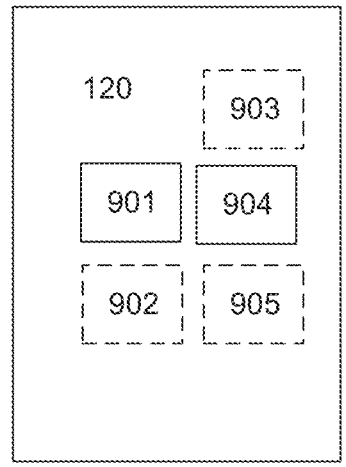
FIG. 9a  FIG. 9b
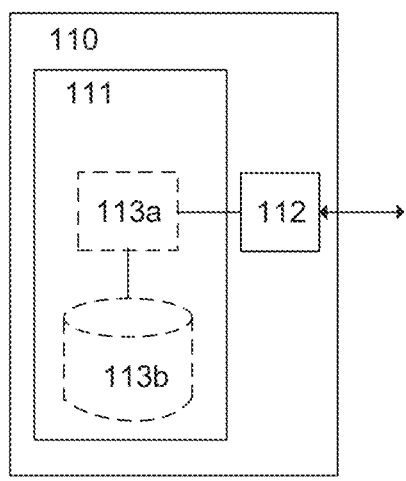 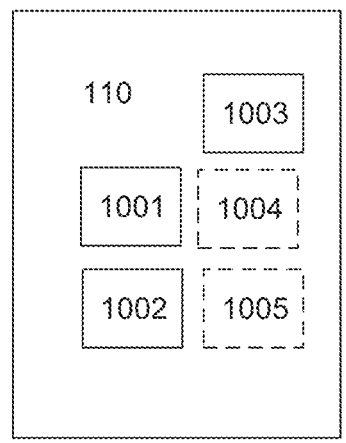
FIG. 10a  FIG. 10b

RANDOM ACCESS CONFIGURATION FOR MTC OPERATION

TECHNICAL FIELD

The disclosure relates to a random access procedure. The disclosure relates to methods for random access message repetition, as well as to a wireless device, and a network node executing these methods.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNodeB or eNodeB, in LTE. An RBS is a general term for a network node capable of transmitting radio signals to a UE and receiving signals transmitted by a UE.

A currently popular vision of the future development of the communication in cellular networks comprises large numbers of small autonomous devices, which typically transmit and receive only small amounts of data infrequently, for instance once per week to once per minute. These devices are generally assumed not to be associated with humans, but are rather sensors or actuators of different kinds, which communicate with application servers for the purpose of configuration of and data receipt from said autonomous devices within or outside the cellular network. Hence, this type of communication is often referred to as machine-to-machine, M2M, communication and the devices are denoted Machine Devices, MDs. The nomenclature used in 3GPP standardization for the communication is Machine Type Communication, MTC, whereas the devices are denoted MTC devices. As these devices are assumed to typically transmit rather seldom, their transmissions will in most cases be preceded by a Random Access, RA, procedure, which establishes the device's access to a network and reveals the device's identity to the network.

Internet of Things (IoT) and the related concept of Machine-Type Communication (MTC) is an important revenue stream for operators and have a huge potential from the operator perspective. It is efficient for operators to be able to serve MTC UEs using already deployed radio access technology. Therefore, 3GPP LTE has been investigated as a competitive radio access technology for efficient support of MTC 3GPP TR 36.888 v12.0.0. Lowering the cost of MTC UEs is an important enabler for implementation of the IoT. Many MTC applications will require low operational UE power consumption and are expected to communicate with infrequent, bursty transmissions and small-size data packets. In addition, there is a substantial market for the M2M use cases of devices deployed deep inside buildings which would require coverage enhancement in comparison to the defined LTE cell coverage footprint.

3GPP LTE Rel-12 has defined a UE power saving mode allowing long battery lifetime and a new UE category allowing reduced modem complexity. In Rel-13, further MTC work is expected to further reduce UE cost and provide coverage enhancement. The key element to enable cost reduction is to introduce reduced UE bandwidth of 1.4 MHz in downlink and uplink within any system bandwidth.

In LTE the system bandwidth can be up to 20 MHz and this total bandwidth is divided into physical resource blocks (PRBs) of 180 kHz. The low-complexity UEs with reduced UE bandwidth of 1.4 MHz that will be introduced in LTE Rel-13 will only be able to receive a part of the total system bandwidth at a time—a part corresponding to up to 6 Physical Resource Blocks, PRBs, in a subframe. In the following, we refer to a group of 6 PRBs as a 'PRB group' or a 'narrowband'.

In 3GPP, coverage enhancement is proposed for MTC applications. In order to achieve the coverage targeted in LTE Rel-13 for low-complexity wireless devices and other types of wireless devices operating delay tolerant MTC applications, time repetition techniques may be used, i.e., enabling energy accumulation of the received signals at the network node, also known as eNB, to achieve such coverage enhancements. For physical data channels (PDSCH, PUSCH), subframe bundling (a.k.a. TTI bundling) can be used. When subframe bundling is applied, each HARQ (re)transmission consists of a bundle of multiple subframes instead of just a single subframe. Repetition over multiple subframes can also be applied to physical control channels. Depending on a UE's coverage situation, different number of repetitions will be used.

From the physical layer perspective, the random access procedure encompasses the transmission of a random access message, also known as a random access preamble, and random access response. A physical random access channel, PRACH, occupies 6 resource blocks in an uplink subframe or in a set of consecutive uplink subframes reserved for random access message transmissions. In the context of the present disclosure, a random access attempt may be composed of multiple repetitions of random access message transmission. The number of repetitions in a random access attempt is also known as a repetition level. The repetition level is correlated to energy accumulation in the receiving eNB.

The maximum bandwidth that Rel-13 low-complexity wireless devices can read in any system is 6 Physical Resource Blocks, PRBs, in a subframe. Furthermore, Rel-13 low-complexity wireless devices often need multiple repetitions to transmit a random access attempt. Consequently, while coverage enhancement through random access message repetition has been proposed, solutions suitable or applicable for low-complexity wireless devices are still wanting.

Hence, there is a need to provide a random access procedure which provides sufficient coverage and is suitable for low-complexity wireless devices, such as low rate MTC devices.

SUMMARY

An object of the present disclosure is to provide solutions which seek to mitigate, alleviate, or eliminate one or more of the above-identified deficiencies in the art and to provide solutions improving random access procedures implementing random access message repetition.

This object is obtained by a method, performed in a wireless device in a wireless network. The method comprises selecting a Random Access Channel, RACH, resource associated with a RACH configuration for random access message repetition with a pre-determined number of repetitions for a single random access attempt and transmitting, for the single random access attempt, a random access message with the pre-determined number of repetitions using the selected RACH resource.

The disclosed method provides significant advantages by configuring RACH random access message transmission for low-complexity communication, e.g., Machine Type Communication, MTC, thereby enabling the wireless device to perform random access attempts using multiple transmissions of random access messages in a single random access attempt, so that one random access message transmission can be repeated multiple times and span multiple random access message, i.e., preamble, transmission opportunities during the single random access attempt. RACH resources are associated with RACH configuration indexes so that random access message repetition only occurs in preamble transmission opportunities specified by RACH configuration index.

According to an aspect of the disclosure, the method further comprises receiving information on RACH resources available for random access message repetition, wherein the received information comprises an associated RACH configuration for each RACH resource.

According to a further aspect, the received information comprises frequency hopping information comprising a list of RACH resources available for random access message transmission during a single random access attempt and a frequency hopping period. Hence, the disclosed method enables frequency hopping in a single random access attempt.

According to an aspect of the disclosure, the method further comprises determining a random access message transmission power based on the pre-determined number of random access message repetitions of the RACH configuration. Thus, the random access message power calculation is adjusted to take the number of repetitions into account.

According to an aspect of the disclosure, the method further comprises determining a repetition starting point, i.e., a repetition starting point in time, based on the predetermined number of random access message repetitions. Thus, the radio access message transmission may be initiated at an appropriate transmission opportunity for the RACH configuration of the selected RACH resource. The potential starting point of the repetitions is determined in order to align transmissions and receptions.

According to an aspect of the disclosure, the method further comprises determining a Random Access Response window based on the transmit format of the random access response. Thus, RACH timing for receiving a random access response and associated actions in the wireless device is defined.

According to a further aspect of the disclosure, the method further comprises when the single random access attempt fails, incrementing the random access message transmission power for a retry random access attempt and/or selecting a retry number of random access message repetitions greater than the pre-determined number for a retry random access attempt. Accordingly, the present disclosure reveals how mechanisms for improving likelihood of success for a single random access attempt.

According to an aspect of the disclosure, the random access message comprises a Physical Random Access Channel, PRACH, preamble.

The above mentioned object of the disclosure is also obtained by a computer readable storage medium, having stored thereon a computer program which, when executed in a wireless device, causes the wireless device to execute any of the above mentioned method aspects.

Likewise, the object of the disclosure is obtained by a wireless device that is configured for performing a random access procedure in a wireless network. The wireless device comprises a communication unit configured to communicate with a network node in a cell of the wireless network. The wireless device further comprises processing circuitry, configured to cause the wireless device to select a Random Access Channel, RACH, resource associated with a RACH configuration for random access message repetition with a pre-determined number of repetitions for a single random access attempt, and to transmit, using the communication unit, for the single random access attempt, a random access message to said wireless network with a the pre-determined number of repetitions using the selected RACH resource.

The wireless device and the computer program enable the corresponding advantages of those described above in relation to the method performed in a wireless device.

The object to provide solutions improving random access procedures implementing random access message repetition is also obtained by a method, performed in a network node in a wireless network, for performing a random access procedure. The method comprises associating for a cell of said wireless network, a first Random Access Channel, RACH, resource, with a first RACH configuration and associating, for the cell, a second RACH resource with a second RACH configuration. The method further comprises sending an indication of the first and second RACH configurations, wherein at least one of said first and second RACH configuration indicate random access message repetition for a single random access attempt.

According to an aspect of the disclosure, the random access procedure is performed using a RACH resource associated with a RACH configuration for random access message repetition with a pre-determined number of repetitions for a single random access attempt and a repetition starting point is determined, for the RACH configuration, based on number of repetitions.

According to an aspect of the disclosure, the method further comprises determining, for the RACH configuration, a Random Access Response window based on the repetition level, where the Random Access Response window size depends on the transmit format of the random access response.

The above mentioned object of the disclosure is also obtained by a computer readable storage medium, having stored thereon a computer program which, when executed in a network node, causes the network node to execute any of the above mentioned method aspects.

Likewise, the object of the disclosure is obtained by a network node that is configured for performing a random access procedure in a wireless network. The network node comprises a communication unit configured to communicate with a wireless device in a cell of the wireless network. The wireless device further comprises processing circuitry configured to cause the network node to associate, for a cell of said wireless network, for a first Random Access Channel, RACH, resource with a first RACH configuration and to associate, for the cell, a second RACH resource with a second RACH configuration. The processing circuitry is further configured to send, using the communication unit, an indication of the first and second RACH configurations, wherein at least one of said first and second RACH configuration indicate random access message repetition for a single random access attempt.

The method performed in a network node, the computer program and the network node enable the corresponding advantages of those described above in relation to the method performed in a wireless device.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

BRIEF DESCRIPTION OF THE DRAWINGS

The present disclosure will be more readily understood through the study of the following detailed description of the embodiments/aspects together with the accompanying drawings, of which:

FIG. 9a and FIG. 9b illustrate a wireless device.

FIG. 10a and FIG. 10b illustrate a network node.

Figure 1:
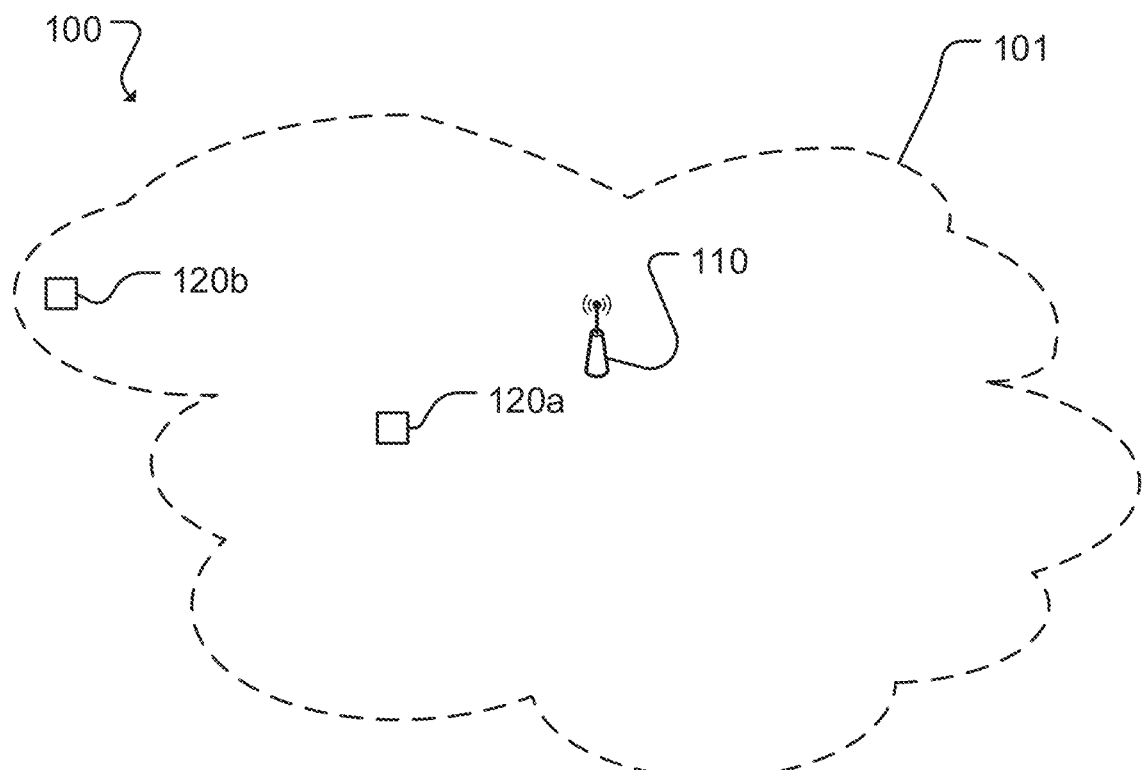
FIG. 1 illustrates a cell of a wireless network.

It should be added that the following description of the embodiments is for illustration purposes only and should not be interpreted as limiting the disclosure exclusively to these embodiments/aspects.

DETAILED DESCRIPTION

Various example embodiments will now be described more fully with reference to the accompanying drawings in which some example embodiments are illustrated.

The example embodiments are capable of various modifications and alternative forms. However, the disclosed embodiments, shown by way of example, will be detail. It should be understood that there is no intent to limit example embodiments to the particular details disclosed. On the contrary, example embodiments are to cover all modifications, equivalents and alternatives within the scope of the claims. In the description, like numbers refer to like elements throughout the description of the figures.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Embodiments of the present disclosure relate, in general, to the field of configuring random access resources, in a LTE wireless network. However, it must be understood that the same principle is applicable in other wireless networks for the purpose of configuring resources for random access.

In the present disclosure, the term wireless device is generally used. A wireless device, or user equipment, UE, which is the term used in the 3GPP specifications, referred to in this application could be any wireless device capable of communicating with a wireless network. Additionally, mobile, user terminal, mobile unit, mobile station, subscriber terminal, and remote station may be considered synonymous to wireless device. Examples of such devices are of course mobile phones, smartphones, laptops and Machine to Machine, M2M, devices etc. However, one must appreciate that capability to communicate with a wireless network could be built in almost any device e.g. a car, a lamp post, a scale and so on.

In the present disclosure, the term network node is generally used. A network node, or radio network node, may describe equipment that provides data connectivity between a network and a wireless device, e.g., an eNodeB or other type of access point or base station. The term network node could also represent network equipment configured to contribute to a random access procedure in a wireless network.

In an LTE system, an uplink resource block is a time-frequency resource consisting of resource elements in the form of 12 subcarriers of 15 kHz each in the frequency domain and a number of OFDM symbols, such as DFTS-OFDM symbols, of one slot of 0, 5 ms size in the time domain, where two slots equals one sub frame of 1 ms. However, in a wider sense a Random Access preamble, in the following disclosure also denominated random access message, (such as one sent by the UE in the first message of the LTE Random Access procedure) can also be seen as a Random Access resource, enabling separation of signals using the same time-frequency resource.

Embodiments of the present disclosure will be described more fully hereinafter with reference to the accompanying drawings, in which embodiments of the disclosure are shown. This disclosure may, however, be embodied in many different forms and should not be construed as limited to the embodiments set forth herein. Like reference signs refer to like elements throughout.

3GPP LTE Rel-12 has defined a UE power saving mode allowing long battery lifetime and a new UE category allowing reduced modem complexity. In Rel-13, further MTC work is expected to further reduce UE cost and provide coverage enhancement. The key element to enable cost reduction is to introduce reduced UE bandwidth of 1.4 MHz in downlink and uplink within any system bandwidth.

In LTE the system bandwidth can be up to 20 MHz and this total bandwidth is divided into physical resource blocks (PRBs) a 180 kHz. The low-complexity UEs with reduced UE bandwidth of 1.4 MHz that will be introduced in LTE Rel-13 will only be able to receive a part of the total system bandwidth at a time—a part corresponding to up to 6 Physical Resource Blocks, PRBs. Here we refer to a group of 6 PRBs as a 'PRB group' or a 'narrowband'.

The LTE RACH Procedure

For better understanding of the proposed technique the LTE RACH procedure will now be briefly described.

FIG. 1 schematically illustrates a cellular network 100 comprising a base station 110 and two wireless devices 120a, 120b, e.g. MTC devices. In a cell 101 like the one disclosed in FIG. 1, wireless devices are located at different distances from the base station 110, wherein the channel characteristics vary due to different reasons e.g. distance to base station, disturbing radio sources or obstacles such as buildings.

An ongoing study item on low cost Machine Type Communication, MTC, in 3GPP Radio Access network, RAN 1 aims to enhance coverage with 20 dB coverage enhancements (CE) for low rate MTC devices. To achieve these coverage enhancements multiple channels will need to be improved. This disclosure aims at coverage enhancements in the random access procedure also referred to as RACH procedure. RACH stands for random access channel. A RACH is intrinsically a transport channel used by mobile phones and other wireless devices. However, the term RACH is often used as a general term referring to the random access procedure.

As an example, the random access procedure of a 3GPP Evolved Packet System, EPS, also known as a 3GPP Long Term Evolution/System Architecture Evolution, LTE/SAE, network is briefly described below.

In 3GPP Release 11, the Long Term Evolution, LTE, random access procedure is a four step procedure used for initial access when establishing a radio link, to re-establish a radio link after radio-link failure, to establish uplink synchronization or as a scheduling request if no dedicated scheduling-request resources have been configured on the Physical Uplink Control Channel, PUCCH.

Figure 2:
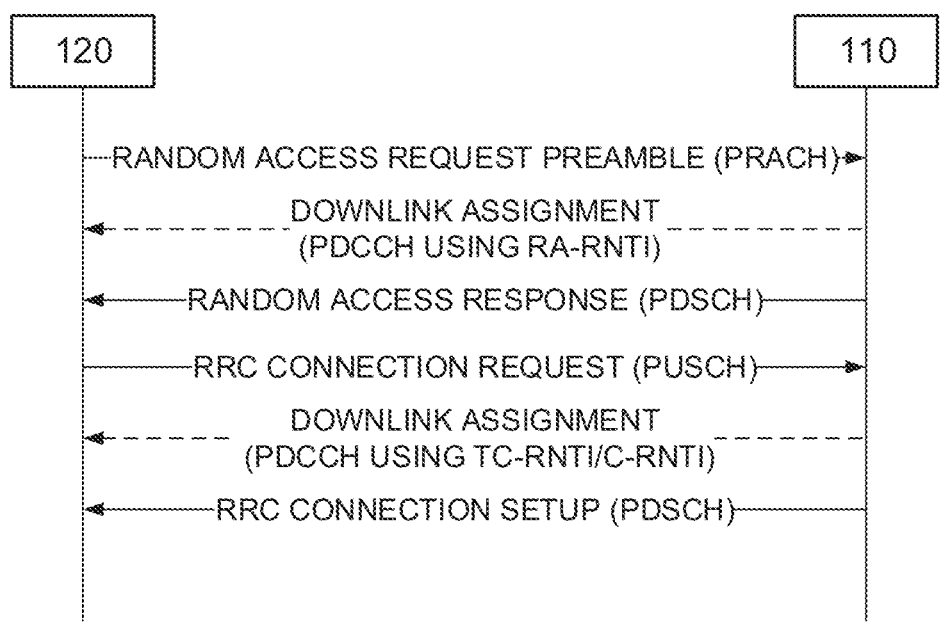
FIG. 2 illustrates the sequence of messages exchanged between a device and an eNodeB during a random access procedure.

3GPP Release 11 provides for a LTE random access procedure which is used in several situations: for initial access when establishing a radio link (moving from Radio Resource Control (RRC)_IDLE to RRC_CONNECTED state); to re-establish a radio link after radio-link failure; to establish uplink synchronization; or, as a scheduling request if no dedicated scheduling-request resources have been configured on the Physical Uplink Control Channel, PUCCH. The 3GPP Release 11 LTE random access procedure essentially comprises four basic steps which encompass a sequence of messages exchanged between the terminal and the eNodeB, as generally illustrated in FIG. 2. In FIG. 2, the four steps essentially correspond to the solid arrows, whereas the dotted arrows essentially correspond to control signaling for the solid arrow step which the dotted arrows precede. For example, the second step is the second arrow (dotted) and the third arrow (solid). The second arrow (dotted) tells the UE to listen to the third arrow corresponding to the second step. Further in the same way the fifth arrow tells the UE to listen to the fourth step in the RA-procedure corresponding to the last arrow. These basic four steps are briefly discussed below.

Figure 3A:
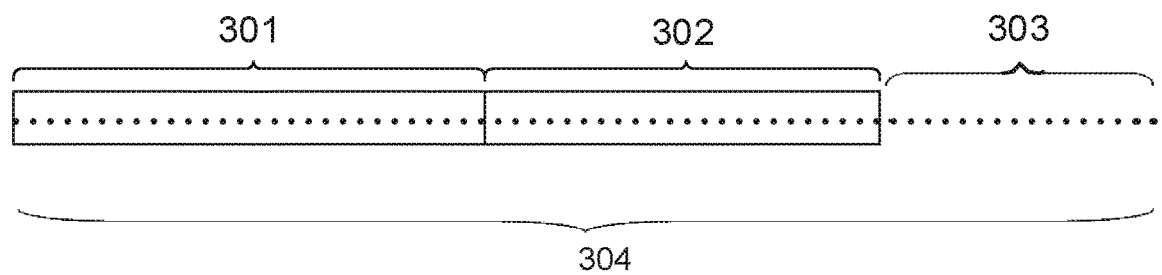
FIG. 3a illustrates two preamble subsets defined for contention-based access.

A first step in the random-access procedure comprises transmission of a random access message, also known as a random-access preamble, on a Random Access Channel, RACH, i.e., the Physical Random-Access Channel, PRACH. As part of the first step of the random-access procedure, the terminal randomly selects one preamble to transmit, out of one of the two subsets 301, 302 defined for contention-based access as illustrated in FIG. 3a. In LTE totally 64 preambles 300 are defined in each cell. Contention-based setup is used when there is a risk for collision of two UEs accessing the same resource. The subsets used for contention free setup 303 are used e.g. at handover, where there is no risk for collision.

LTE uses OFDM in the downlink and DFT-spread OFDM in the uplink. The basic LTE downlink physical resource can thus be seen as a time-frequency grid as illustrated in 3b, where each resource element corresponds to one OFDM subcarrier during one OFDM symbol interval.

Figure 3B:
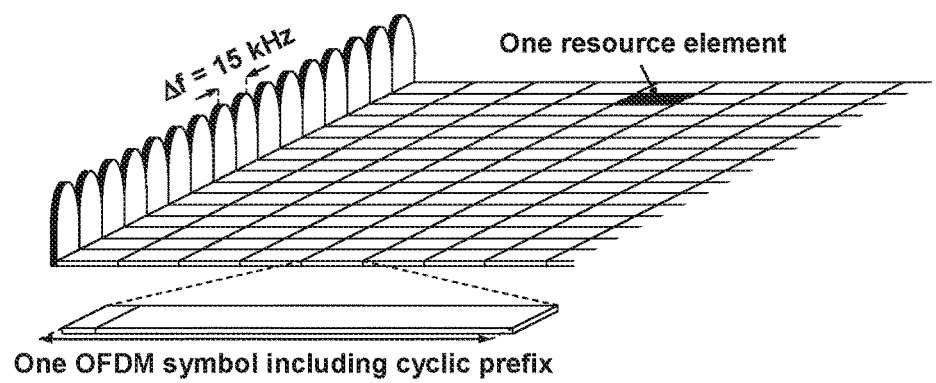
FIG. 3b illustrates the LTE downlink physical resource.
Figure 3C:
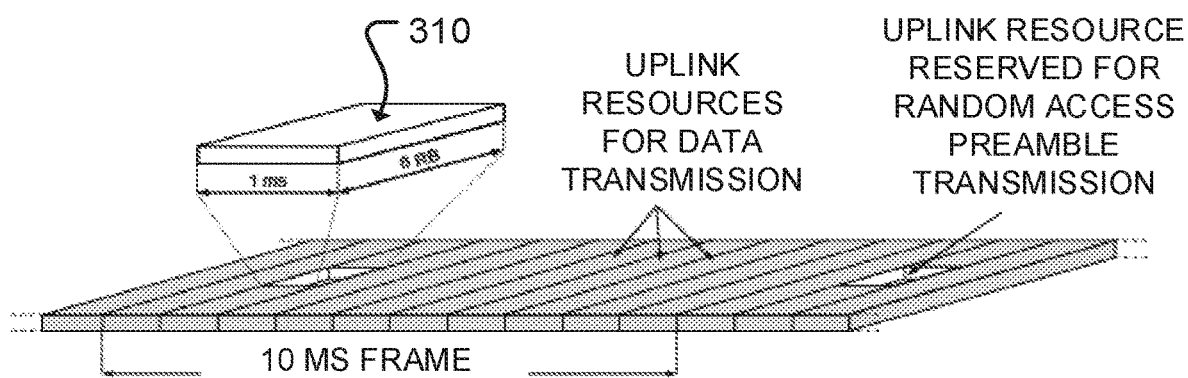
FIG. 3c is an illustration of random access preamble transmission in the time-frequency domain.

Which subset to select the preamble from, is given by the amount of data the terminal would like to, and from a power perspective can, transmit on the Physical Uplink Shared Channel, PUSCH, in the third random access step. A time/frequency resource to be used for these transmissions is illustrated in FIG. 3c, which is understood by reading "4G-LTE/LTE Advanced for Mobile Broadband" by E. Dahlman et al, Academic Press, 2011. The time/frequency resource 310 to be used is given by the common PRACH configuration of the cell, which can be further limited by an optional, UE specific mask, which limits the available random access transmission opportunities for the given UE. This is more thorough described in "3GPP TS 36.321 v.10.0.0. Medium Access Control (MAC) protocol specification" and "3GPP TS 36.331 v.10.3.0. Radio Resource Control (RRC) protocol specification".

A second step of the random access procedure comprises the Random Access Response. In the Random Access Response the eNodeB transmits a message on the Physical Downlink Shared Channel, PDSCH, containing the index of the random-access preamble sequences the network detected and for which the response is valid; the timing correction calculated by the random-access preamble receiver; a scheduling grant; as well as a temporary identify, TC-RNTI, used for further communication between the UE and network. A UE which does not receive any Random Access Response in response to its initial random-access preamble transmission of step 1 above within a pre-defined time window, will consider the random access attempt failed, and will repeat the random access pre-amble transmission, possibly with higher transmit power, up to a number of maximum of four times, before considering the entire random-access procedure failed.

The third step of the random access procedure serves, e.g., to assign a unique identity to the UE within the cell, C-RNTI. In this third step, the UE transmits the necessary information to the eNodeB using the PUSCH resources assigned to the UE in the Random Access Response.

The fourth and last step of the random-access procedure comprises a downlink message for contention resolution. The message of this fourth step is also known as the RRC Connection Setup message. Based on the contention resolution message each terminal receiving the downlink message will compare the identity in the message with identity transmitted in the third step. Only a terminal which observes a match between the identity received in the fourth step and the identity transmitted as part of the first step will declare the random access procedure successful, otherwise the terminal will need to restart the random access procedure.

The UE power to use in the random access attempt is calculated according to a specified formula, known from "3GPP TS 36.213 v.10.6.0. Physical layer procedures", reproduced as Expression 1 below, with parameters carried in the system information. If the UE does not receive a RandomAccessResponse in the second step of the procedure, the transmit power of the following PRACH transmission is increased by a parameter delta value up until limited by the UE maximum power:

PPRACH=min{$P_{CMAX,c}(i)$,PREAMBLE_RE-
CEIVED_TARGET_POWER+$PL_c$}_[dBm]   Expression 1:

In Expression 1, $P_{CMAX,c}(i)$ is the configured UE transmitting power as defined in "3GPP TS 36.213 v.10.6.0. Physical layer procedures" for sub frame i of the primary cell and $PL_c$ is the downlink path loss estimate calculated in the UE for the primary cell.

Hence, there are situations where a UE is unable to access the network due to Random Access Channel, RACH, coverage problems, e.g. the UE has Broadcast Control Channel, coverage and can thus measure on the cell and read the cell's system information, but the network cannot receive random access attempts, i.e., random access preamble transmissions, from the UE because the UE is power/coverage limited, and hence the received signal in the network is too weak. This is the case, for example, for a user placed indoor served by a cell with high output power.

As an alternative starting from LTE Release 11, a UE can be configured to connect to multiple cells at once, i.e. one primary cell and one or several secondary cells and use so called carrier aggregation. In this case, the user equipment is also allowed to transmit RACH requests on the "secondary" cells, if the cells belong to different timing advance groups. However, if a device does not support carrier aggregation with multiple timing advance values random access is only allowed on the primary cell.

Hence, the above described random access procedure provides insufficient coverage.

The transmission of random access requests is generally restricted to certain allocated time and frequency resources. In LTE Release 11 communication systems, Physical Random Access, PRACH, resources can be configured in different ways dependent on e.g. cell size. Generally the guard and cyclic prefix, i.e. the "empty" period between the preamble transmissions, differ between the different PRACH formats and gives different alternatives depending on cell size. Some formats resend the same preamble two or more times subsequently.

As previously disclosed, time repetition techniques may be used to achieve coverage enhancements, i.e., enabling energy accumulation of the received signals. For physical data channels, subframe bundling may be used. Repetition over multiple subframes can also be applied to physical control channels. Depending on the coverage situation, different number of repetitions will be applied to the physical control channels From the physical layer perspective, the L1 random access procedure encompasses the transmission of random access preamble and random access response. The remaining messages are scheduled for transmission by the higher layer on the shared data channel and are not considered part of the L1 random access procedure. A physical random access channel (PRACH) occupies 6 resource blocks in an uplink subframe or set of consecutive uplink subframes reserved for random access message transmissions.

Hence, in present systems different configurations are used for different cells, see also 3GPP TS 36.211 V11.0.0 (2012-10)—section 5.7. For frame structure type 1 (i.e., FDD) with PRACH preamble format 0-3, there is at most one random access resource per subframe. TS 36.211 Table 5.7.1-2 lists the preamble formats and the subframes in which random access preamble transmission is allowed for a given configuration in frame structure type 1 (i.e., FDD). Similar PRACH configuration exists for frame structure type 2 (i.e., TDD).

TABLE 1

(from TS 36.211v12.3.0, Table 5.7.1-2: Frame structure type 1 random access configuration for preamble formats 0-3)

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

A random access configuration specifies the time and frequency of associated downlink resources. The configuration includes all time slots on a certain frequency f1, or a selected number of frequencies on a carrier f1.

Figure 4:
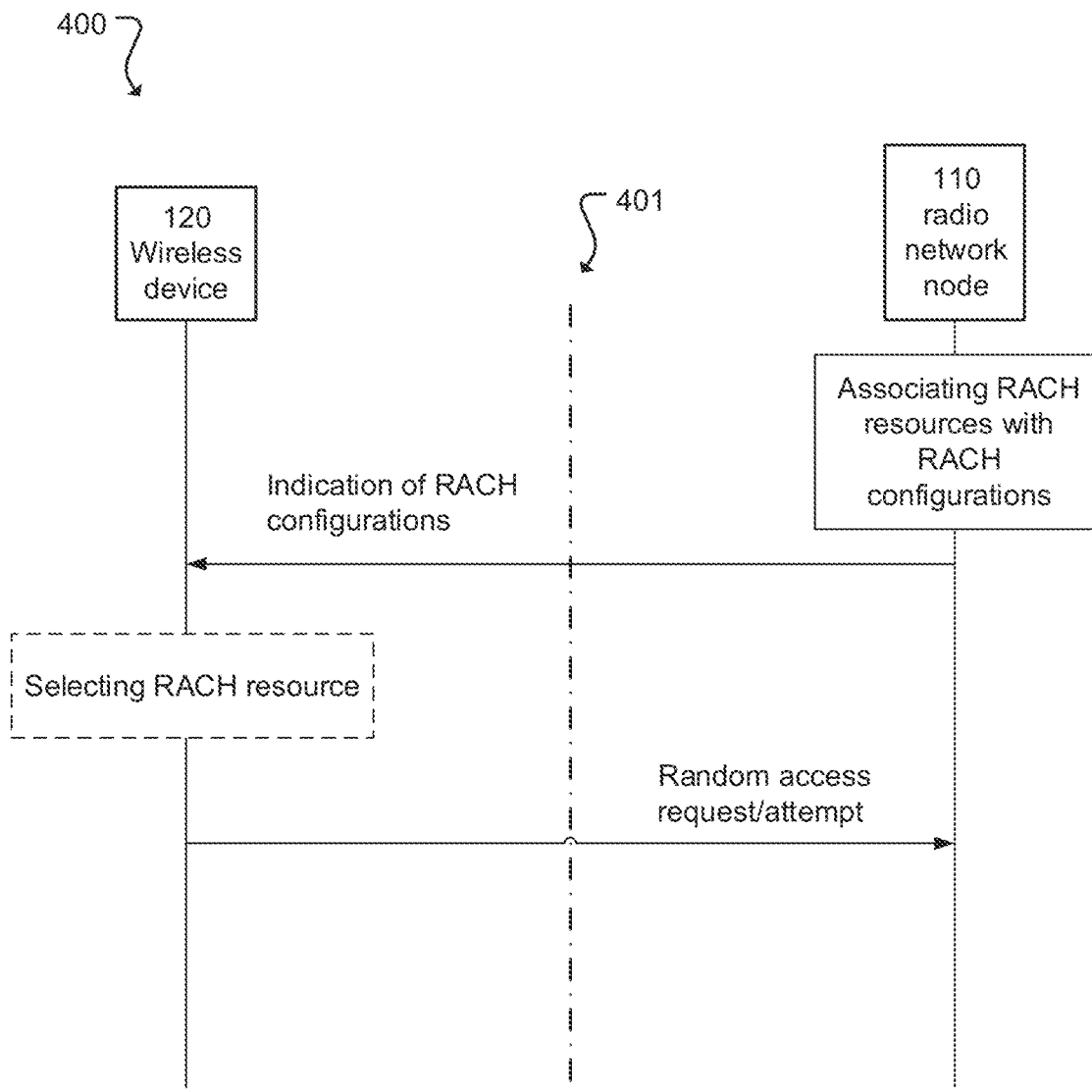
FIG. 4 illustrates an overview of the signaling in a system when performing random access channel configuration, RACH, and selection according to an exemplary embodiment of the present disclosure.

FIG. 4 is a combined signaling diagram and flowchart showing an overview of the signaling in a system 100, comprising a wireless device 120 and network node 110, when performing the random access channel configuration and selection according to some embodiments of the technology disclosed herein. More specifically, FIG. 4 discloses an overview of the messages going between the wireless device 120 and the network node 110.

The network node 110, further described in FIG. 10a and FIG. 10b, is e.g. a base station node, also simply known as "base station".

The network node 110 comprises a communication unit 112 through which the network node 110 communicates on both uplink (UL) and downlink (DL) with the wireless device 120 over a radio or air interface 401. The radio or air interface 401 is illustrated by a dashed-dotted line in FIG. 4. In similar manner, the wireless device, further described in FIG. 9a and FIG. 9b, also comprises a communication unit 122.

As schematically disclosed in FIG. 4, the RACH configurations for respective RACH resources, e.g., frequency resources also referred to as narrowband resources or narrowbands, are provided by the network node 110 and indications of the RACH configurations are sent, e.g., broadcasted in a System Information Broadcast, SIB, message, to one or more wireless device 120 in a cell defined by the network node. The wireless device selects a RACH resource associated with a RACH configuration and transmits a random access attempt using the selected RACH resource. In the context of the present disclosure, the terminology of RACH resource, frequency resource, narrowband or PRACH resource are used interchangeably to represent resources applicable for random access message transmission, i.e., random access preamble transmission.

Figure 5:
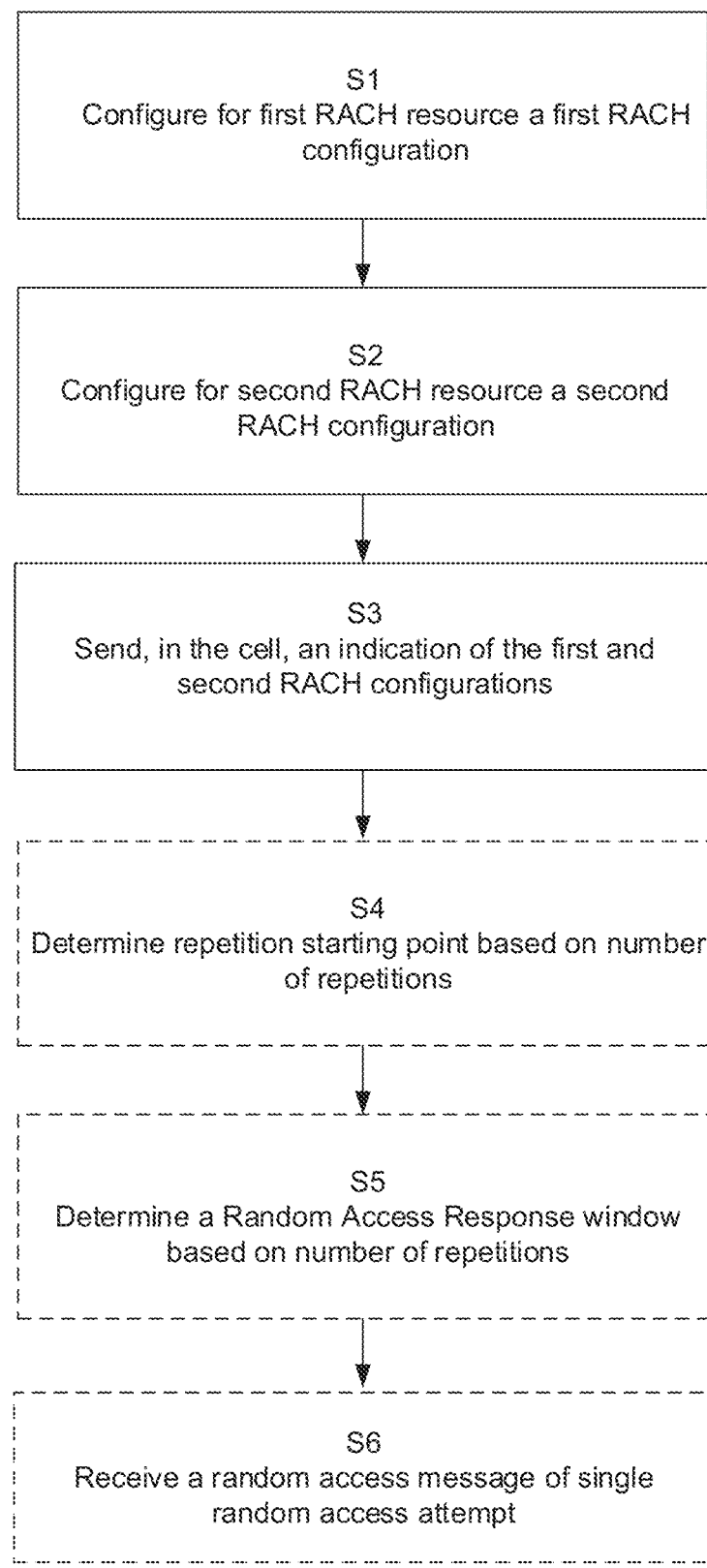
FIG. 5 is a flow chart illustrating method steps performed by a network node according to exemplary embodiments of the present disclosure.
Figure 6:
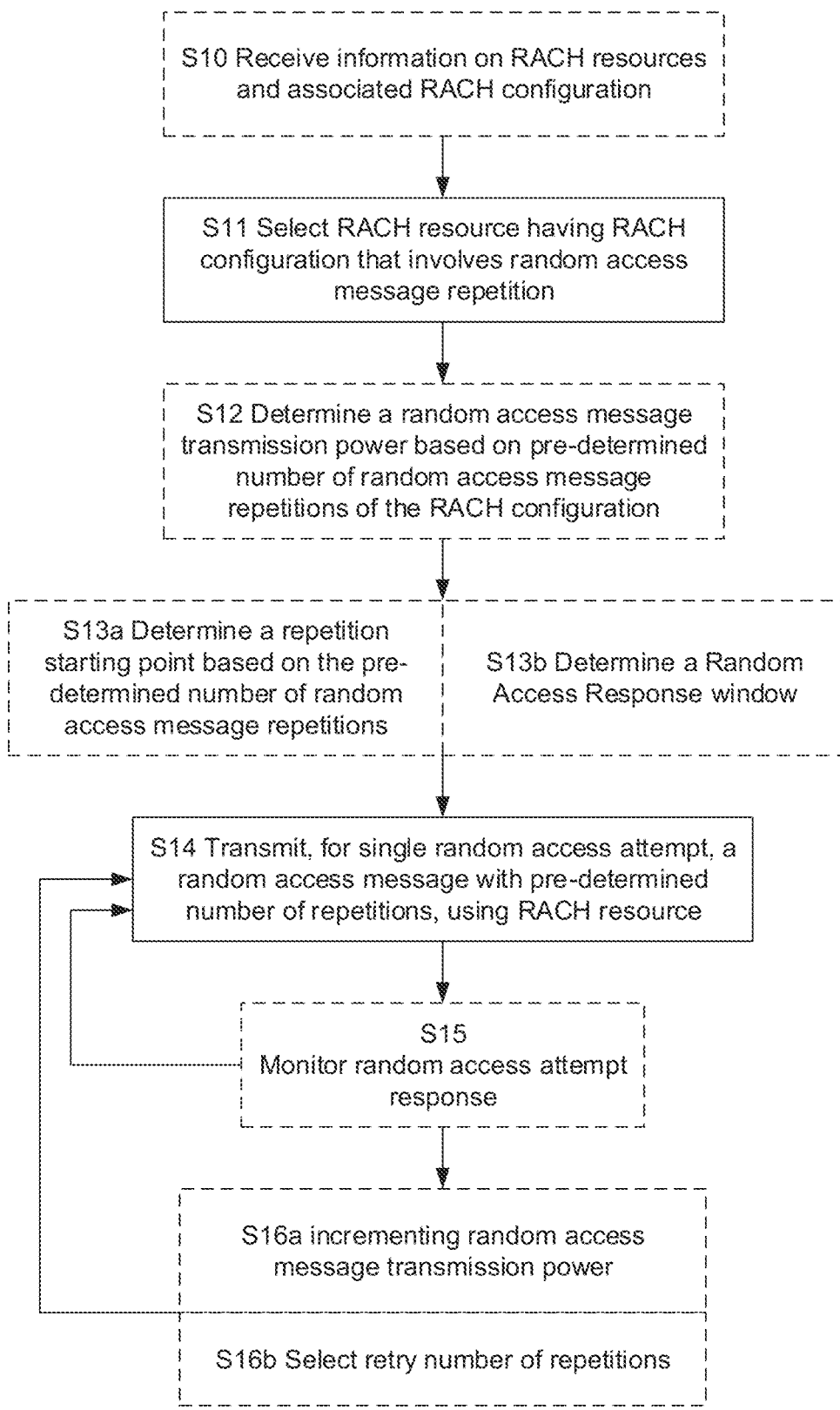
FIG. 6 is a flow chart illustrating method performed by a wireless device according to exemplary embodiments of the present disclosure.

Turning to FIGS. 5 and 6, method steps performed by the network node 110 and the wireless device 120 respectively for the proposed random access procedure are disclosed. In the presentation below, a general outline of these method steps performed in the respective nodes will first be presented followed by a discussion focusing on aspects of the random access procedure as a whole. In the following disclosure, PRACH configuration index and RACH configuration indexes will be discussed interchangeably. More specifically, PRACH configuration index denotes a represents a configuration index within the general denomination of RACH configuration index. Likewise, PRACH configuration denotes a configuration within the general denomination RACH configuration.

FIG. 5 discloses a method performed in a network node 110 in a wireless network 100 for performing a random access procedure. The method comprises associating S1 for a cell of said wireless network, a first Random Access Channel, RACH, resource, with a first RACH configuration, and associating S2 for the cell, a second RACH resource, with a second RACH configuration. Following the association, the network nodes, sends S3, in the cell, an indication of the first and second RACH configurations, wherein at least one of said first and second RACH configuration is configured for random access message repetition for a single random access attempt. In the context of the present disclosure, it will be understood that, although the terms first and second are used herein to distinguish between various configurations and resource elements, such configurations and resources are not limited by these terms. First and second are only used to distinguish the respective configurations and resources, and a first configuration could just as well be denominated as a second configuration, without departing from the scope of example embodiments. Also, the disclosure is not limited to use of two configurations or RACH resources, the disclosed principle is equally applicable to any number of configurations or RACH resources. A further discussion on such configurations and resources will follow below.

FIG. 6 discloses wireless device aspects associated with the random access procedure of FIG. 5. The wireless device selects S11a Random Access Channel, RACH, resource associated with a RACH configuration for random access message repetition with a pre-determined number of repetitions for a single random access attempt. For the single random access attempt, a random access message is transmitted S14 with the pre-determined number of repetitions using the selected RACH resource.

According to an aspect of the disclosure, the wireless device receives S10 information on RACH resources available for random access message repetition, wherein the received information comprises an associated RACH configuration for each RACH resource. Such information may be retrieved from the indications on RACH configurations, e.g., first and second RACH configurations, sent S3 by the network node. The RACH resources are, according to an aspect of the disclosure, selected based on channel quality measurements and appropriate RACH configurations for the predetermined number of repetitions.

Further details on RACH configuration and aspects relating to the pre-determined number of repetitions will be detailed below.

Random Access Channel Resources and Configuration

As discussed above, a maximum bandwidth of low-complexity wireless device is 6 Physical Resource Blocks, PRBs in a subframe. Aspects of this disclosure propose that multiple narrowbands of 6 PRB can be defined. In other words, in one cell, there are several available narrow frequency resources that may be used depending on network conditions. Such narrowband frequency resource represents a RACH resource. In the following disclosure, RACH narrowband, narrowband, frequency resource and RACH resource may be used interchangeably. A RACH resource may comprise e.g. allocated resource elements (RE) in a time frequency domain as illustrated in FIG. 3b. The RACH resources may be used for transmission of a random access preamble and/or repetition of a random access preamble, by a wireless device. Multiple different RACH resources may be allocated for a cell. For each RACH resource there will be a separate random access channel configuration, RACH. Random access channel, RACH, configuration in this disclosure refers to the configuration of RACH resources and comprises e.g., RACH and PRACH configuration index and repetitions and settings for frequency hopping.

According to some aspects, this disclosure relates to a method performed for performing a random access procedure in a wireless network. As previously disclosed, this method comprises associating S1 in a cell of said wireless network, a first Random Access Channel, RACH, resource, with a first RACH configuration and associating S2 in the cell, a second RACH resource, with a second RACH configuration, wherein said first and second random access channel configuration, RACH, have different RACH configuration indexes and/or random access message repetition levels. The RACH resources are e.g. narrow frequency resources of e.g. 1.4 MHz, also denominated narrowbands or frequency resources in the context of the present disclosure. A repetition level corresponds to a number of repetitions, i.e., a pre-determined number of repetitions. For example, there may be 3 repetition levels defined, where the 1st repetition level corresponds to 5 repetitions, 2nd repetition level corresponds to 10 repetitions, and the 3rd repetition level corresponds to 20 repetitions.

In the following, RACH configuration and PRACH configuration will be discussed; PRACH configuration denoting a configuration within the denomination RACH configuration.

The PRACH configuration of 1st narrowband can be the same as legacy UE, and has no preamble repetition. This is e.g. used by MTC devices close to the eNodeB.

PRACH configuration of 2nd narrowband can be different, taking into consideration the coverage enhancement (CE) level the cell supports, load, etc.), and it includes preamble repetition.

Similarly, for the j-th narrowband configured for PRACH transmission, PRACH configuration of j-th narrowband can have its own PRACH configuration index and preamble repetition level.

The method further comprises sending S3, in the cell, an indication of the first and second RACH configurations, wherein at least one of said first and second RACH configuration indicate random access message repetition for a single random access attempt.

In general, a cell with large bandwidth and higher load uses PRACH configuration of more available transmission opportunities. Since wireless device with high repetition level costs more transmission opportunities, wireless devices of different repetition level should use different RACH resources having respective RACH configurations.

Considering, the disclosure from FIG. 6 again, a RACH resource having a RACH configuration for random access message repetition with a pre-determined number of repetitions of a single random access attempt is selected S11 and the random access message is transmitted S14 with the predetermined number of repetitions for the single random access attempt using the selected RACH resource.

According to an aspect of the disclosure, the RACH resource is selected based on channel quality measurements and appropriate RACH configuration for the pre-determined number of repetitions; assigning the wireless device to a specific RACH resource.

According to a further aspect of the disclosure, the wireless device receives S10 information, e.g., in an indication sent from the network node, on RACH resources available for random access message repetition, wherein the received information comprises an associated RACH configuration for each RACH resource. Indications sent from the network node may be broadcasted in a System Information Block, SIB.

As mentioned, wireless device of different repetitions level should use different PRACH configurations. For example:

A wireless device that requires no preamble repetition can be assigned to 1st narrowband/RACH resource. The $1^{st}$ narrowband can be a RACH resource shared with legacy wireless devices;

A wireless device that requires 2-10 preamble repetitions can be assigned to a $2^{nd}$ narrowband/RACH resource. The second narrowband has relatively frequent RACH transmission opportunity, for example, 2 subframes for every radio frame;

A wireless device that requires 11-20 preamble repetitions can be assigned to a 3rd narrowband/RACH resource.

The 3rd narrowband has more frequent RACH transmission opportunity than $2^{nd}$ narrowband, for example, 5 subframes for every radio frame;

A wireless device that requires more than 20 preamble repetitions can be assigned to a 3rd narrowband/RACH resource. The 4th narrowband has the most frequent RACH transmission opportunity, for example, every subframe (i.e., 10 subframes) for every radio frame.

Figure 7:
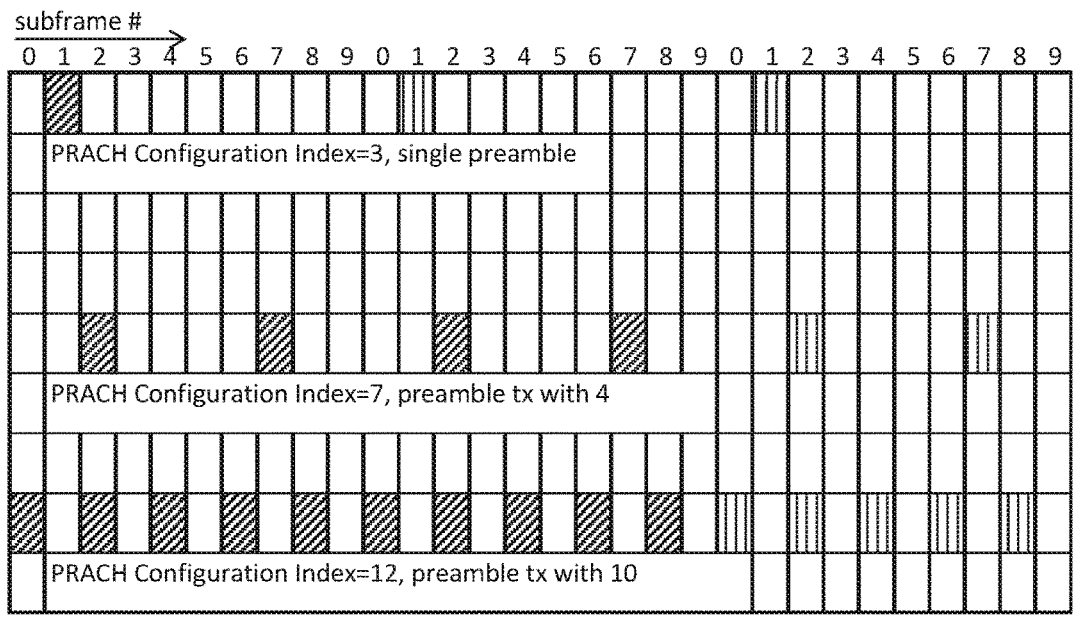
FIG. 7 is an illustration of radio access message configurations with multiple transmission opportunities in a subframe for FDD.
Figure 7:
Figure 7:

FIG. 7 illustrates the preamble transmission opportunities over multiple Physical Random Access Channels, PRACH, using the following as an example:

FDD

3 UL narrowbands for PRACH transmission opportunity:

For the first narrowband (upper row) PRACH Configuration Index=3 (see table above), and it is intended for wireless devices with single preamble transmission (i.e., no repetition). This narrowband can also be shared with legacy UE.

For the second narrowband (middle row): PRACH Configuration Index=7, and it is intended for wireless devices with 4 repetitions for a preamble transmission. Alternatively this narrowband can be used by wireless devices with frequency hopping period of 4 repetitions, i.e., the wireless device stays at a given narrowband for 4 preamble transmission opportunities before switching to another narrowband.

For the third narrowband (lower row): PRACH Configuration Index=12, and it is intended for wireless devices with 10 repetitions for a preamble transmission. Alternatively this narrowband can be used by wireless devices with frequency hopping period of 10 repetitions, i.e., the wireless device stays at a given narrowband for 10 preamble transmission opportunities before switching to another narrowband.

The different PRACH configurations can also be mapped to the same narrowband(s). In this case wireless devices with different repetition levels are distinguished by their use of different PRACH sequences (code multiplexing).

Frequency hopping between two or more RACH/PRACH resources may also be applied. According to aspects of the present disclosure, the information received by the wireless device, further comprises frequency hopping information, e.g., a list of RACH resources available for random access message transmission during a single random access attempt and a frequency hopping period.

For example the wireless device could transmit X repetitions of the preamble within one narrowband, then hop to a second narrowband to transmit X repetitions, and then hop back to the first narrowband to transmit X repetitions, and so on until all repetitions have been transmitted. Each wireless device can randomly select which narrowband to use as the initial narrowband to transmit preamble on, so that PRACH collision between wireless devices using the same set of PRACH narrowband can be reduced. While not necessary, it is preferable that PRACH narrowbands grouped for a frequency hopping pattern share the same PRACH configuration index so that radio access message transmission timing is simple.

Figure 8:
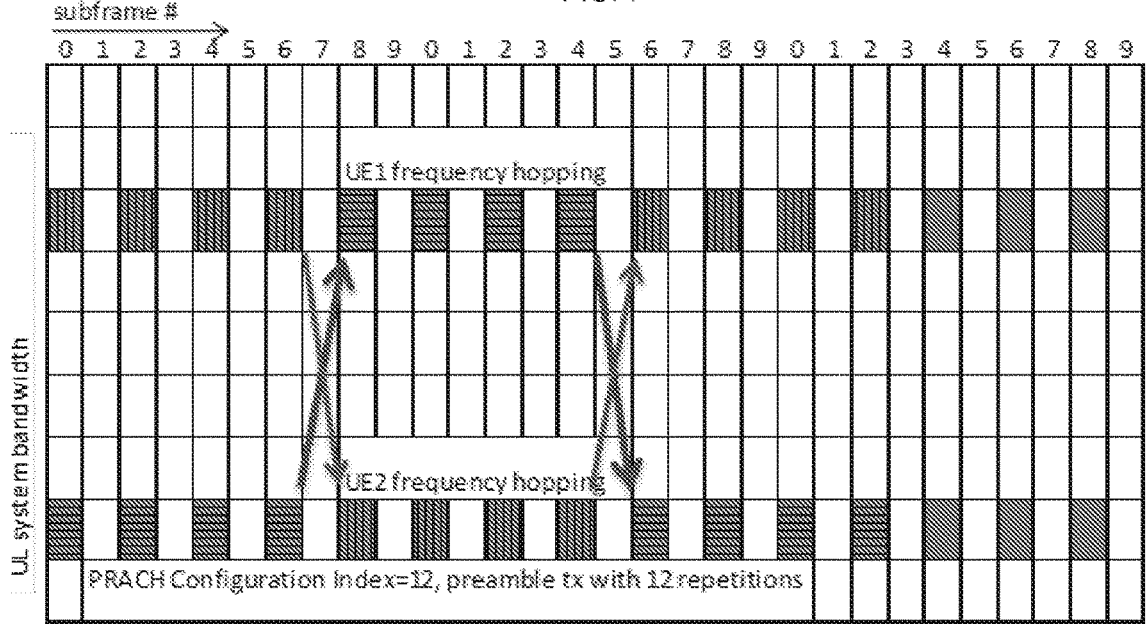
FIG. 8 is an illustration of radio access message transmission where the radio access message is repeated multiple times over a series of transmission opportunities, wherein frequency hopping between two narrowbands configured for PRACH transmission is used.
Figure 8:
Figure 8:
Figure 8:

FIG. 8 illustrates frequency hopping of preamble transmission with multiple repetitions. The wireless device hops between two narrowbands, when transmitting radio access messages, also known as preambles. First some preambles are transmitted on one narrowband, and then some preambles are transmitted on another. In FIG. 8, the wireless device transmits 4 repetitions of the preamble within a narrowband before switching to another narrowband and frequency hopping patterns for preamble transmission of two wireless devices are multiplexed in time and frequency.

The eNB broadcasts at least the following in a system information block (SIB) for MTC PRACH configuration:
- List of narrowband available for preamble transmission of MTC UE; the narrowband info provides frequency location of preamble transmission within UL system bandwidth. The PRACH narrowband is 6 PRB in size. The narrowband can be specified via either (a) narrowband index or (b) frequency offset in terms of PRB.
- List of PRACH Configuration Index, one for each PRACH narrowband described above.
- Frequency Hopping info:
  - If frequency hopping of PRACH is enabled or not;
  - If frequency hopping of PRACH is enabled a hopping pattern comprising:
    - A list of narrowband the UE may hop to;
    - The frequency hopping period X.
- Repetition Starting Point Since a random access attempt is composed of multiple random access message repetitions, there is a need to define the allowed starting point (radio frame index and/or subframe index) of each random access attempt. In other words, the wireless device and network node need to know which the first is and which is the last preamble repetition that can be combined.

This could be done for each narrowband in the previous example or it could be done for only one narrowband.

In a network node wherein the random access procedure is performed using a RACH resource having a RACH configuration for random access message repetition with a pre-determined number of repetitions for a single random access attempt, a repetition starting point may be determined S4 based on number of repetitions. According to an aspect of the disclosure, determination of a repetition starting point may also be performed in the wireless device, i.e., the wireless device determines S13a a repetition starting point based on the pre-determined number of random access message repetitions. As will be further discussed below, the repetition starting point may be determined as a system frame number, SFN. In the following presentation $N_{PRACH,rep}$ is the number of repetitions of a random access message format for a given random access attempt.

For the purpose of determining a repetition starting point, the concept of a PRACH density value is introduced, the PRACH density value, $D_{RA,t}$, being a number of PRACH transmission opportunities for a PRACH configuration.

If the PRACH resource is reoccurring in all radio frames, the set of possible starting radio frames have SFN (System Frame Number):

$$SFN_{PRACH,start} = j * \text{ceiling}(N_{PRACH,rep}/D_{RA,t})$$

where j, j>=0, is an integer, $N_{PRACH,rep}$ is the number of repetitions of an existing preamble format for the given random access attempt, $D_{RA,t}$ is the PRACH density value in time which is equal to the total number of preamble transmission opportunities at a given uplink, UL, narrowband, within a given period of time, when repetition is not used. Typically, $D_{RA,t}$ is counted for a single narrowband within a radio frame (i.e., 10 ms) where the radio frame is available for PRACH according to the PRACH Configuration. $D_{RA,t}$ does not count different transmission opportunities in different narrowbands within a subframe. The ceiling functions map a real number to the smallest following integer.

Typically, for Rel-13 MTC, a given narrowband is a given set of 6 contiguous PRBs. For example, in FIG. 7, the uppermost narrowband has $D_{RA,t}=1$, the second narrowband has $D_{RA,t}=2$, the 3rd narrowband has $D_{RA,t}=5$.

If the PRACH resource is reoccurring in even radio frames, $D_{RA,t}$ is counted for a single narrowband within an even-indexed radio frame according to the PRACH Configuration. The set of possible starting radio frames have SFN:

$$SFN_{PRACH,start} = 2*j*\text{ceiling}(N_{PRACH,rep}/D_{RA,t})$$

If the PRACH resource is reoccurring in odd radio frames, $D_{RA,t}$ is counted for a single narrowband within an odd-indexed radio frame according to the PRACH Configuration. The set of possible starting radio frames have System Frame Number, SFN:

$$SFN_{PRACH,start} = 2*j*\text{ceiling}(N_{PRACH,rep}/D_{RA,t})+1$$

A wireless device procedure may be defined as follows.
Step 1. For a given PRACH configuration Index, the wireless device determines a $N_{PRACH,rep}$ value for the random access attempt.
Step 2. Then the wireless device determines the set of possible starting radio frames $SFN_{PRACH,start}$.
Step 3. The wireless device randomly selects a starting radio frame index from the set of possible radio frames to start the PRACH preamble transmission.

Corresponding calculations may be done both in the network node and in the wireless device. According to aspects of the disclosure, the wireless device determines a repetition starting point (in terms of radio frame index) based on number of repetitions for a given random access attempt and density value associated with the selected RACH resource.

Thus, the above disclosed procedure specifies in what subframes a first random message transmission of a random access attempt may be transmitted, i.e., the subframes wherein PRACH repetitions may start. The repetition starting point may be expressed in the form of frame or subframe numbers and depend on the number of PRACH repetitions $N_{PRACH,rep}$. The definition of a repetition starting point is an enabler for performing random access with multiple transmission of a random access message during the random access attempt, i.e., transmission of pre-determined number of random access messages using a selected RACH resource.

Random Access Attempt Power Setting

The power of the random access message transmission, also referred to as preamble power ($P_{PRACH}$) relates to the output power level the wireless device uses to transmit a random access message, i.e., a RACH preamble.

The initial power setting is based on open-loop estimation with full compensation for the path-loss. This is designed to ensure that the received power of the random access messages is independent of the path-loss. The wireless device estimates the path-loss by averaging measurements of the downlink Reference Signal Received Power (RSRP). The basis for setting the transmission power of a random access message, i.e., a random-access preamble, is a downlink path-loss estimate obtained from measuring on the cell-specific reference signals. From this path-loss estimate, the initial transmission power is obtained.

In prior art, for each Random Access Preamble transmission, the MAC layer determines a PREAMBLE_RECEIVED_TARGET_POWER as follows:

PREAMBLE_RECEIVED_TARGET_POWER= preambleInitialReceivedTargetPower+DELTA_PREAMBLE+(PREAMBLE_TRANSMISSION_COUNTER−1)*powerRampingStep;   (1)

According to aspects of the present disclosure, the repetition level is considered for the power setting, the wireless device determining S12 a random access message transmission power based on the pre-determined number of random access message repetitions of the RACH configuration.

This implies e.g. that the wireless device selects S11 a random access channel configuration (with an associated repetition level) and associated RACH resource and determines S12 a random access message transmission power based on the number of random access message repetitions of the selected configuration.

According to one example preamble transmission power $P_{PRACH}$ is determined as:

$$P_{PRACH}=\min\{P_{cmax,c}(i), \text{PREAMBLE\_RECEIVED\_TARGET\_POWER}+PL_c-P_{RAlevel}\}\_[\text{dBm}], \quad (2)$$

where $P_{CMAX,c}(i)$ is the configured UE transmit power for subframe i of serving cell c and $PL_c$ is the downlink path loss estimate calculated in the UE for serving cell c.

The proposed power offset, taking repetitions into account is e.g.:

$$P_{RAlevel}=10 \log 10(N_{PRACH,rep}),$$

where $N_{PRACH,rep}$ is the number of repetitions the UE uses to transmit the given PRACH. The UE determines the PRACH repetition level NPRACH,rep according to RSRP/RSRQ measurement. For example, M possible values of NPRACH,rep can be predefined, NPRACH,rep,set=[5, 10, 20, 40, 60, 80], and the UE selects the appropriate NPRACH,rep for initial random access attempt.

The wireless device is configured to monitor S15 a Random Access Response window for one or more responses to the single random access attempt, and to transmit S14, for a retry random access attempt, a random access message with a retry number of repetitions when the single random access attempt fails.

Thus, when a random access attempt fails, the wireless device may retry with another preamble transmission performing S16 one or both of the following for the retry random access attempt: incrementing S16a the random access message transmission power and/or selecting S16b a retry number of repetitions greater than the pre-determined number of repetitions.

In one variant, the PREAMBLE_TRANSMISSION_COUNTER is incremented by 1, resulting in a higher PREAMBLE_RECEIVED_TARGET_POWER. Thus the UE can retry with a higher transmission power.

In another variant, the UE can select a new, higher NPRACH,rep, for the retry, without increasing PREAMBLE_RECEIVED_TARGET_POWER. Let the initial random access attempt have PREAMBLE_TRANSMISSION_COUNTER=1, and NPRACH,rep=NPRACH,rep,set(i0) repetitions. When PREAMBLE_TRANSMISSION_COUNTER is incremented, it causes the UE to use the next higher NPRACH,rep but the same PREAMBLE_RECEIVED_TARGET_POWER as the previous random access attempt. That is, for the second random access attempt, PREAMBLE_TRANSMISSION_COUNTER=2, and NPRACH,rep=NPRACH,rep,set(i0+1). In general, as the UE re-attempts random access, the UE use the number of repetitions:

$$N\text{PRACH,rep}=N\text{PRACH,rep,set}(i0+\text{PREAMBLE\_TRANSMISSION\_COUNTER}-1) \quad (3)$$

This is useful for MTC UE since Rel-13 MTC UE is expected to have low maximum transmit power. When the MTC UE changes the repetition level of preamble transmission, it may also change other parameters of preamble transmission, including preamble sequence, UL narrowband index, frequency hopping pattern, etc. For example, tune to a different narrowband which corresponds to the new repetition level.

In yet another variant, the UE can increase both NPRACH,rep and PREAMBLE_RECEIVED_TARGET_POWER. For example, the UE can increase transmission power according to (1). When the criteria for increasing repetition level is reached (e.g., when maximum transmission power is reached or a number of preamble attempts is reached), the UE then increases number of repetitions according to (3).

According to an aspect of the disclosure, the retry random access attempt is a next random access attempt or a periodically re-occurring sub-Sequent retry random access attempt.

Consequently, in a variant, the UE does not increase NPRACH,rep and/or PREAMBLE_RECEIVED_TARGET_POWER at every retry but only at every Nth retry and re-uses the last value for NPRACH,rep and/or PREAMBLE_RECEIVED_TARGET_POWER for the other retries at the same repetition level. N may be a fixed constant or a configurable parameter (e.g. indicated in the broadcasted system information). N may be the same or different for different repetition levels.

Thus, the above disclosed procedure for random access power setting provides the ability to adapt the power setting to a repetition level selected for the random access procedure and to increase the power setting when a random access attempt fails, thereby improving the coverage enhancement aspects of the proposed random access procedure in that further power accumulation is enabled at the side of the wireless device.

Random Access Transmission Timing

For the L1 random access procedure, the wireless devices s uplink transmission timing after a random access preamble transmission is as follows.

a) If a random access response, RAR, with associated RA-RNTI, Random Access-Radio Network Temporary Identifier, is detected, the RAR is a response to the transmitted random access message, i.e., preamble sequence, and the last subframe containing repetition for RAR transmission is subframe n, the wireless device shall, according to the information in the response, transmit an UL-SCH transport block in the first subframe n+$k_1$, $k_1 \geq 6$, if the UL delay field above is set to zero where n+$k_1$ is the first available UL subframe for PUSCH transmission, where for TDD serving cell, the first UL subframe for PUSCH transmission is determined based on the UL/DL configuration (i.e., the parameter subframeAssignment) indicated by higher layers. The wireless device shall postpone the PUSCH transmission to the next available UL subframe after n+$k_1$ if the field is set to 1.
  1. Note that in the above, the last subframe n for RAR transmission could be:
     i. Last subframe of M-PDCCH repetition, if the M-PDCCH DCI carries the RAR message;
     ii. Last subframe of PDSCH repetition, with or without an M-PDCCH scheduling the PDSCH, if the PDSCH transport block carries the RAR message.
b) If a random access response is received by subframe n, where subframe n is the last subframe containing repetition for the RAR transmission, and the DL transmission does not contain a response to the transmitted preamble sequence, the wireless device shall, if requested by higher layers, be ready to make another random access attempt no later than in subframe $n+k_2$. Typically $k_2=5$. The preamble transmission, with repetition starts in the first preamble transmission opportunity of first available radio frame $SFN_{PRACH,start}$.
1. Note that in the above, the corresponding DL transmission could be:
    i. M-PDCCH DCI transmission, if the M-PDCCH DCI carries the RAR message;
    ii. PDSCH transport block transmission, with or without an M-PDCCH scheduling the PDSCH, if the PDSCH transport block carries the RAR message.
2. Note that in the above, the random access attempt comprises transmitting a new preamble sequence with $N_{PRACH,rep}$ number of repetitions. Preferably the preamble repetitions occur only in subframes that contain legacy (i.e., not repeated) preamble transmission opportunity.

c) If no random access response is received by subframe n, where subframe n is the last subframe containing M-PDCCH repetition in the random access response window, the UE shall, if requested by higher layers, be ready to transmit a new preamble sequence no later than in subframe $n+k_3$. Typically $k_3=4$.

d) In case a random access procedure is initiated by a "PDCCH order" in where the subframe n is the last subframe containing repetition of the M-PDCCH carrying the order, the UE shall, if requested by higher layers, transmit random access preamble in the first subframe $n+k_2$, $k_2 \geq 6$, where a PRACH resource is available. Here the first available PRACH resource is the first preamble opportunity of first available radio frame $SFN_{PRACH,start}$.

Random Access Response Window Size

According to some aspects the disclosure comprises determining S5, for the RACH configuration, a Random Access Response window based on the repetition level, where the Random Access Response window size depends on the transmit format of the random access response.

The wireless device monitors random access response in in the RA Response window. For UEs using PRACH with repetition, ra-ResponseWindowSize is interpreted to be the number of random access response opportunities, where each random access response opportunity includes the total number of subframes needed for M-PDCCH repetition and/or PDSCH repetition corresponding to a single RAR transmission.

The absolute length of RA response window size is a function of RACH repetition level. Let a single random access attempt spans R subframes, then the absolute length of RA response window spans (R*ra-ResponseWindowSize) subframes regardless of possible occurrence of measurement gap.

When RAR is carried by M-PDCCH-scheduled PDSCH, R=Rc, where Rc is the number of repetitions used by M-PDCCH; Note that in this case, for the last possible attempt, the PDSCH part falls outside of the RA Response Window, but the M-PDCCH part (which is what UE monitors) is contained in the RA Response Window.

When RAR is carried by M-PDCCH DCI, R=Rc, where Rc is the number of repetitions used by M-PDCCH;

When RAR is carried by M-PDCCH-less PDSCH, R=Rd, where Rd is the number of repetitions used by the PDSCH.

In Release 8 of LTE time/frequency resources for random access, here referred to as "RACH resources", are indicated in the broadcasted system information. The term "RACH resources" here refers to both physical resources, i.e. frequencies and time slots, of the physical RACH, PRACH, as well as the preambles.

Turning now to FIG. 9a a schematic diagram illustrating some modules of an exemplary embodiment of the wireless device 120 will be described. A wireless device referred to in this application could be any user equipment capable of communicating with a mobile communication network. Examples of such devices are of course mobile phones, smartphones, laptops and Machine to Machine, M2M, devices etc. However, one must appreciate that capability to communicate with a multi-hop network could be built in almost any device e.g. a car, a lamp post, a scale and so on.

The wireless device 120 comprises a communication unit 122 configured to communicate with a network node in a cell of a wireless network. The wireless device also comprises processing circuitry 121 arranged for selecting a Random Access Channel, RACH, resource associated with a RACH configuration for random access message repetition with a pre-determined number of repetitions for a single random access attempt; and transmitting, using the communication unit 122, for the single random access attempt, a random access message to said wireless network with a the pre-determined number of repetitions using the selected RACH resource. According to an aspect of the disclosure, the processing circuitry 121 comprises a controller or a processor 123a that may be constituted by any suitable Central Processing Unit, CPU, microcontroller, Digital Signal Processor, DSP, etc., capable of executing computer program code. The computer program may be stored in a memory (MEM) 123b. The memory 123b can be any combination of a Read And write Memory, RAM, and a Read Only Memory, ROM. The memory 123b may also comprise persistent storage, which, for example, can be any single one or combination of magnetic memory, optical memory, or solid state memory or even remotely mounted memory.

When the above-mentioned computer program code is run in the processing circuitry 121 of the wireless device 120 it causes the wireless device to perform the methods of any of the embodiments described above and below.

According to some aspects the wireless device 120 comprises modules configured to perform the methods described above, see FIG. 9b. The modules are implemented in hardware or in software or in a combination thereof. The modules are according to one aspect implemented as a computer program stored in a memory 123b which run on the processing circuitry 121 being a CPU. According to some aspects, the modules are logical circuits in the processing circuitry 121.

The wireless device 120 comprises a resource selection module 901 configured to select a Random Access Channel, RACH, resource associated with a RACH configuration for random access message repetition with a pre-determined number of repetitions for a single random access attempt; and a transmitter module 904 configured to transmit, for the single random access attempt, a random access message to the wireless network with a predetermined number of repetitions using the RACH resource.

According to some aspects the wireless device 120 comprises a determiner module 902 configured to determine a random access message transmission power based on the pre-determined number of random access message repetitions of the selected configuration.

According to some other aspects, the wireless device 120 comprises a determiner module 903 configured to determine a random access message repetition starting point (in terms of radio frame index and/or subframe index) based on number of repetitions (e.g. of an existing random access message format/for the given random access attempt) and density value of random access message transmission opportunity associated with a selected RACH resource. According to another aspect, the determiner module 903 may also be configured to determine a Random Access Response window based on the transmit format of the random access response.

According to some aspects the wireless device 120 comprises a consideration module 906 configured to, when the random access attempt fails, for further random access attempts performing one or both of the following for the next random access attempt: (a) incrementing preamble power and/or (b) increase repetition level.

According to another aspect, the wireless device also comprises a monitoring module 905, configured to monitor the Random Access Response window for one or more response to the single random access attempt.

Turning now to FIG. 10a, a schematic diagram illustrating some modules of an exemplary embodiment of a network node 110 will be described. The network node 110 may be implemented as an Evolved Node B (eNB or eNodeB) in LTE, but may also be implemented in the radio access technology Global System for Mobile communications, GSM or Universal Mobile Telecommunications System or WiMax. The network node 110 further comprises a communication interface (i/f) 112 arranged for wireless communication with other devices or nodes, such as the wireless device 120. The network node 110 also comprises processing circuitry 111 arranged for associating for a cell of said wireless network, a first Random Access Channel, RACH, resource, with a first RACH configuration, and associating for the cell, a second RACH resource, with a second RACH configuration. The processing circuitry 111 is further configured for sending in the cell, using the communications unit, an indication of the first and second RACH configurations, wherein at least one of said first and second RACH configuration indicate random access message repetition for a single random access attempt.

According to an aspect of the disclosure, the processing circuitry comprises a controller (CTL) or a processor 113a that may be constituted by any suitable Central Processing Unit, CPU, microcontroller, Digital Signal Processor, DSP, etc., capable of executing computer program code. The computer program may be stored in a memory (MEM) 113b. The memory 113b can be any combination of a Read And write Memory, RAM, and a Read Only Memory, ROM. The memory 113b may also comprise persistent storage, which, for example, can be any single one or combination of magnetic memory, optical memory, or solid state memory or even remotely mounted memory. When the above-mentioned computer program code is run in the processor 113a of the network node 110, it causes the network node 110 it causes the network node 110 to perform the methods of any of the embodiments described above and below.

According to some aspects the network node 110 comprises modules configured to perform the methods described above, see FIG. 10b. The modules are implemented in hardware or in software or in a combination thereof. The modules are according to one aspect implemented as a computer program stored in a memory 113b which run on the processor 113a being a CPU. According to some aspects, the modules are logical circuits in the processor 113b.

The network node 110 comprises a first Random Access Channel, RACH, configuration module 1001 configured to configure for a first RACH resource a first RACH configuration in a cell of the wireless network. The network node 110 further comprises a second RACH configuration module 1002 configured to configure, for a second RACH resource, a second RACH configuration in a cell of the wireless network. A sender module 1003 is configured to send, an indication of the first and second RACH configurations, wherein at least one of said first and second RACH configuration is configured for random access message repetition for a single random access attempt.

According to some aspects the network node 110 comprises a determiner 1004 configured to determine, for the first random access channel configuration, RACH, a random access message repetition starting point (e.g. in terms of radio frame index or subframe index) for a single random access attempt based on number of repetitions (e.g. of an existing random access message format/for the given random access attempt) and density value of random access message transmission opportunity associated with a selected RACH resource.

According to some aspects the network node 110 comprises a window determiner module 1005 configured to determine, for the first RACH configuration, a Random Access Response window based on the repetition level, where the Random Access Response window size depends on the transmit format (i.e. control+data for RAR, or control-only for RAR, or data-only for RAR) of the random access response.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated.

In the drawings and detailed description, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed by a user equipment in a wireless network, the method comprising:
   receiving information indicating Random Access Channel (RACH) physical resources, said information indicating a set of RACH physical resources for transmission of a random access preamble for random access attempts that use a first number of repetitions of the random access preamble for each random access attempt; and transmitting, for a single random access attempt, a random access preamble with the first number of random access preamble repetitions using at least the set of RACH physical resources, wherein the transmitted random access preamble with the first number of random access preamble repetitions is transmitted according to a frequency hopping pattern, and wherein a starting frequency location of the frequency hopping pattern is randomly selected by the user equipment.

2. The method of claim 1, wherein the frequency hopping pattern allows multiplexing in time and frequency with a frequency hopping pattern of another user equipment.

3. The method of claim 1, wherein the transmission power of the random access preamble to be transmitted is based at least on the first number of random access preamble repetitions.

4. The method of claim 1, wherein a starting point, for a random access attempt, is based at least on the first number of random access preamble repetitions.

5. The method of claim 1, further comprising:
transmitting, for a retry random access attempt, a random access preamble with a retry number of repetitions if the single random access attempt is not successful.

6. The method of claim 1, wherein the retry number of repetitions is greater than the first number of repetitions.

7. The method of claim 6, wherein the retry random access attempt is a next random access attempt or a periodically re-occurring sub-sequent retry random access attempt.

8. The method of claim 1, wherein the received information is indicated in a system information block message broadcasted by a radio network node.

9. The method of claim 1, wherein the RACH physical resources correspond to Orthogonal Frequency-Division Multiplexing (OFDM) physical resources, and wherein the random access preamble to be transmitted is randomly selected from a plurality of random access preambles for contention-based access.

10. A wireless device for a wireless network, the wireless device comprising:
a communication unit configured to communicate with a network node in a cell of said wireless network, and;
processing circuitry configured to cause the wireless device to:
receive information indicating Random Access Channel (RACH) physical resources, said information indicating a set of RACH physical resources for transmission of a random access preamble for random access attempts that use a first number of repetitions of the random access preamble for each random access attempt; and
transmit, for a single random access attempt, a random access preamble with the first number of random access preamble repetitions using the set of RACH physical resources, wherein the transmitted random access preamble with the first number of random access preamble repetitions is transmitted according to a frequency hopping pattern, and wherein a starting frequency location of the frequency hopping pattern is randomly selected by the user equipment.

11. The wireless device of claim 10, wherein the frequency hopping pattern allows multiplexing in time and frequency with a frequency hopping pattern of another user equipment.

12. The wireless device of claim 10, wherein the transmission power of the random access preamble to be transmitted is based at least on the first number of random access preamble repetitions.

13. The wireless device of claim 10, wherein a starting point, for a random access attempt, is based at least on the first number of random access preamble repetitions.

14. The wireless device of claim 10, wherein the processing circuitry is further configured to cause the wireless device to:
transmit, for a retry random access attempt, a random access preamble with a retry number of repetitions if the single random access attempt is not successful.

15. The wireless device of claim 14, wherein the retry number of repetitions is greater than the first number of repetitions.

16. The wireless device of claim 15, wherein the retry random access attempt is a next random access attempt or a periodically re-occurring subsequent retry random access attempt.

17. The wireless device of claim 10, wherein the received information is indicated in a system information block message broadcasted by a radio network node.

18. The wireless device of claim 10, wherein the RACH physical resources correspond to OFDM physical resources, and wherein the random access preamble to be transmitted is randomly selected from a plurality of random access preambles for contention-based access.

19. A method, performed by a user equipment in a wireless network, the method comprising:
receiving information indicating Random Access Channel (RACH) physical resources, said information indicating a set of RACH physical resources for transmission of a random access preamble for random access attempts that use a first number of repetitions of the random access preamble for each random access attempt; and
transmitting, for a single random access attempt, a random access preamble with the first number of random access preamble repetitions using the set of RACH physical resources, wherein the transmission power of the transmitted random access preamble is based at least on the first number of random access preamble repetitions.

* * * * *

UNITED STATES PATENT AND TRADEMARK OFFICE
CERTIFICATE OF CORRECTION

PATENT NO. : 10,694,541 B2  
APPLICATION NO. : 16/218004  
DATED : June 23, 2020  
INVENTOR(S) : Blankenship et al.

Page 1 of 1

It is certified that error appears in the above-identified patent and that said Letters Patent is hereby corrected as shown below:

In the Specification

In Column 18, Line 14, delete "sub-Sequent retry random access" and insert -- sub-sequent retry random access --, therefor.

In Column 20, Line 36, delete "one or combination" and insert -- one or more combination --, therefor.

In Column 21, Line 51, delete "one or combination" and insert -- one or more combination --, therefor.

In the Claims

In Column 24, Line 30, in Claim 16, delete "subsequent retry random access" and insert -- sub-sequent retry random access --, therefor.

Signed and Sealed this  
Twentieth Day of October, 2020

Andrei Iancu  
*Director of the United States Patent and Trademark Office*